United States Patent Office 3,291,959
Patented Dec. 13, 1966

3,291,959
PROCEDURE AND EQUIPMENT FOR THE AUTOMATIC FOCUSSING OF THE CHARGE CARRIER BEAM IN DEVICES FOR THE WORKING OF MATERIALS BY MEANS OF A CHARGE CARRIER BEAM
Fritz Schleich, Unterkochen, Wurttemberg, and Justus Sienknecht, Frankfurt am Main, Germany, assignor, by mesne assignments, to United Aircraft Corporation, East Hartford, Conn., a corporation of Delaware
Filed Nov. 9, 1962, Ser. No. 239,864
Claims priority, application Germany, Nov. 18, 1961, Z 9,079
19 Claims. (Cl. 219—121)

This invention relates to charge carrier beam apparatus and, more particularly, to the method and means for controlling beam focussing.

In the prior art devices for working material by an impinging beam of charge carrier, the point of impingement of the beam on the material to be worked is observed through an observation microscope. The operator can in this way control the positioning of the beam on the workpiece and the adjusting of the smallest cross section of the impinging beam upon the surface of the workpiece.

Control of beam positioning can be effected automatically by photoelectric scanners and servo controls.

However, focussing of the beam has not been obtainable by the equipment known to the art in automatic fashion, but has required observation and operator control.

Further, in such equipment, it is often desirable to so focus the beam that the smallest cross section of the beam is displaced along the beam axis by a predetermined distance from the surface of the material.

Accurate control of such displacement is difficult, if not impossible with the prior art apparatus.

It is, therefore, an object of the present invention to provide an improved method and apparatus for automatic focussing of a charge carrier beam.

It is a further object of this invention to provide an improved method and apparatus for focussing a charge carrier beam so that the plane of smallest beam cross-section may be adjustably displaced from the plane of the surface of the workpiece.

It is a still further object of this invention to provide an improved method and apparatus for focussing a charge carrier beam so that the plane of smallest cross section is in the plane of the surface of the material or at a predetermined distance above or below the surface plane and to control the focussing continuously to maintain such conditions despite contours of the material surface.

Briefly, the method according to the present invention comprises focussing of the beam by a current responsive lens and varying the current flow through the lens in a predetermined cycle. As the lens current is cycled, the charge carrier emission from the material being worked by the impinging beam is measured. When the measured amplitude of the emission reaches an extreme value which is an unambiguous criteria of the attainment of optimum focussing, the lens current variation is stopped and the lens current maintained at the amplitude corresponding to optimum focussing.

In order to measure the emission of charge carrier, there is provided an interceptor electrode, which is preferably of annular shape surrounding the beam and which is positioned to collect the emitted charge carriers. Suitable bias may be applied to the interceptor ring or electrode to collect the charge carriers.

In some embodiments, a second ring may be used to selectively collect charge carrier emission. Alternatively, the emission current may be measured in some applications by measurement of the current flow between the workpiece and ground.

If an object of high electron emission (low electron affinity) and high melting point, e.g., tungsten, is to be worked, then the charge-carriers issuing from the said object are intercepted and upon attainment of a minimum value of the interceptor current, the current flowing through the focussing lens is made constant. In a similar manner the current flowing from the object may be measured wherein however the current flowing through the focussing lens is made constant upon attainment of a maximum value of the current taken from the object. The said focussing procedure is based upon the effect more particularly described in the following.

When a high-intensity electron beam impinges upon a material surface then, as was shown by investigations of prior art, a portion of the electrons will leave the surface of the workpiece again. The said reflection or back scatter of the electrons is dependent upon various properties such as for example, the electron affinity, the surface quality, etc., of the workpiece under treatment. Within the voltage region of interest in this respect, i.e., between 25 kv. and several hundred kv. it is however a well measurable quantity. As long as the electron beam impinging upon the workpiece surface is defocussed its energy density is so low that electrons only are reflected. Thermal electron emission does not yet occur. When the focus of the electron beam is improved then the object is so greatly heated that thermal electron emission occurs. The material does not vaporise but does emit slow electrons. When the focus of the electron beam is further improved, emission of positive ions will occur. The emission of positive ions partially cancels the electron current issuing from the workpiece surface. Therefore, the total current of the charge-carriers issuing from the object becomes less and finally reaches a minimum. The said minimum occurs exactly when the optimum focussing condition of the electron beam is attained. At that time cycling of the current flowing through the focussing lens is stopped and the current held at the value of optimum focussing as determined from the emission measurement.

With the working of tungsten, the positive ion current may become so large that with optimum focussing, it is of higher amplitude than the electron current. Under such conditions a change in the polarity of the current issuing from the object will occur at the optimum focus.

When the current flowing from the object to earth is measured, then, with optimum focussing, the current flowing from the object will attain a maximum as is easily understood from the above discussion.

When an object of low electron emission and of low melting point, e.g., a workpiece of steel is treated, then, with the procedure according to the present invention, the charge-carriers issuing from the object are accelerated and intercepted. Upon attainment of maximum in the interceptor current, the current flowing through the focussing lens is made constant. In such case, it is also possible to apply a negative bias to the workpiece and to measure the current flowing from the workpiece. However, the current flowing through the focussing lens is made constant upon attainment of a minimum value in the current flowing from the object.

In the treatment of an object of low electron emission and low melting point also there occurs at first in the defocussed condition of the electron beam a reflection of electrons. When the focussing condition of the beam is improved, then thermal electron emission occurs. Simultaneously, however, the material vaporises so that only very few positive ions are produced. The emitted thermal electrons pass through the bias voltage to the interceptor and are there collected along with the reflected electrons. In the condition of optimum focussing there will then occur a maximum in the interceptor current.

As can be immediately recognized a minimum will occur in the current flowing from the object to earth at the optimum focussing condition provided that the object has negative bias.

It is also possible in the treatment of an object of high electron emission and high melting point to apply to the interceptor electrode a positive bias. Thereby the thermally emitted electrons also reach the interceptor so that in the optimum focussing condition, a maximum will occur in the interceptor current.

The automatic focussing device here described works very accurately in the manner described if the charge-carrier beam is a pulsed beam. If, however, the charge-carrier beam impinges continuously upon the workpiece, no unambiguously evaluable extreme value of the current emitted from the workpiece is formed. Instead a relatively wide maximum of the emission current is obtained, which maximum may furthermore be interrupted by irregular current variations. In such case, it is advantageous to determine automatically the point of symmetry between the flanks of the current rise and of the current fall and the current flowing through the focussing lens upon attainment of the said point of symmetry is then made constant.

It is not necessary to select the operating point as being exactly midway along the current maximum. The operating point may be displaced to one side by electrical means. For this displacement a preliminary experiment is used to determine the desired displacement for exact focussing and the circuitry for determining the operating point is then adjusted so that the said point will always be adjusted automatically for the position determined in the preliminary experiment.

In order to enable the range within which the current flowing through the focussing lens is periodically varied to be kept as small as possible it is advantageous to adjust the current flowing through the focussing lens by a mechanical or of optical means which serve to sense the surface of the workpiece in such a way that the charge-carrier beam is coarsely focussed. The intensity of the lens current is thereupon periodically varied about the said preset value as the center value and fine adjustment only is carried out according to the procedure above described.

It is also possible at the beginning of the working process to allow the current flowing through the focussing lens to rise slowly and to interrupt the said rise upon attainment of a definite preselected value of the interceptor current or of the current flowing from the object to earth. There starting from the said value the described periodic variation of the lens current begins. The aforesaid preselected value is therein set in such a way that in the subsequent periodic variation of the lens current the optimum focussing condition of the lens is attained with certainty.

The frequency of the variation of the lens current is with advantage kept low so as to lie in the range between 1 and 15 c./s.

Particularly high sensitivity and wide independence from the various properties of the materials treated is obtained when the current arising in the measurement of the quantity of the charge-carriers issuing from the object is fed into a storage device which compares each value of the current with the next subsequent value and which makes the lens current constant at the extreme value as it is determined in each case.

If the locus of the narrowest cross section of the beam is to be fixed above or below the workpiece surface then the current arising during the measurement of the amplitude of the charge-carriers issuing from the object is subjected to a time delay. By suitable adjustment of the delay time it is easily possible to attain that the locus of the narrowest cross section of the beam lies at a predetermined distance above or below the workpiece surface as seen in the direction of the beam.

The equipment according to the invention comprises an interceptor located between the focussing lens and the workpiece to be treated as well as a device for the periodic variation of the intensity of the current flowing through the focussing lens and circuitry for the switching-off of the said device in response to the measurement of the amplitude of the interceptor current.

If the current flowing from the object to earth is used for the adjustment of the focussing condition then the object to be treated is supported so as to be insulated and is connected to earth via a resistance. The current flowing through the said resistance is measured and upon attainment of an extreme value of the said current the current flowing through the focussing lens is made constant.

In many cases it is advantageous to construct the equipment for the automatic focussing in such a way that between the focussing lens and the workpiece there are provided two interceptor electrodes, one electrode to intercept the electrons and one electrode to intercept the ions issuing from the workpiece. The electron interceptor has positive bias voltage relative to the workpiece and has a deflecting magnet arranged before it. The deflecting magnet is provided to insure that electrons only impinge upon the electron interceptor since the ions are scarcely deflected down to their great mass. Both interceptors are connected to switching circuitry serving to determine the difference between the interceptor currents and to switch off the device for the periodic variation of the intensity of the current flowing through the focussing lens upon attainment of a minimum difference between the two interceptor currents.

Having briefly described this invention, it will be described in greater detail in the following portion of the specification which may best be understood by reference to the accompanying drawings, of which:

Figure 1:
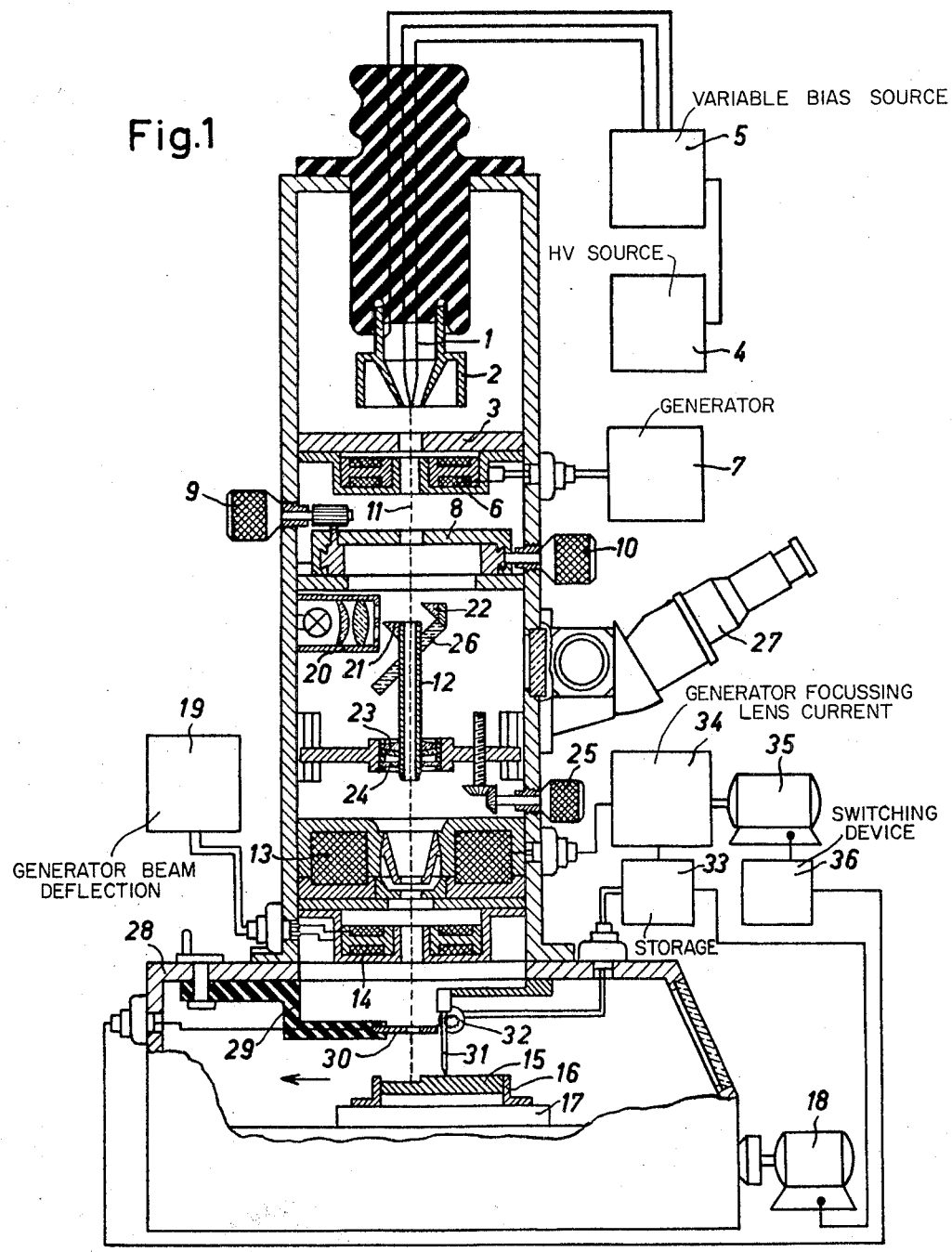
FIG. 1 is a partially sectioned view of an equipment for working materials by a charge carrier beam employing a beam focussing arrangement in accordance with the present invention.

In FIG. 1 there is shown an apparatus for the working of materials by means of an electron beam comprising a cathode 1, a control cylinder 2 and a grounded anode 3 of the beam generating system. In the source 4 a high voltage of, e.g., 100 kv. is produced and is supplied to the device 5 by means of a high-tension lead. The device 5 produces the variable heating voltage and the variable control cylinder bias voltage. The said voltages are supplied to the beam generating system, 1, 2, 3, via a high-tension cable.

Below the anode 3 as seen in the direction of the beam there is arranged a deflecting system 6 which serves to adjust the electron beam 11. The generator 7 serves to supply current to the deflecting system 6.

Below the deflecting system 6 there is arranged a diaphragm 8 which is capable of being moved in the plane of the paper and at right angles to the plane of the paper by means of the knobs 9 and 10. After completion of the adjustment of the electron beam 11 the said beam passes through the grounded tube 12 and is focussed upon the workpiece 15 arranged within the operating chamber 28 by means of the electro-magnetic lens 13.

An electro-magnetic deflecting system 14 arranged below the focussing lens 13 and for the current supply of which the generator 19 is provided serves to deflect the electron beam 11 relative to the workpiece 15.

An optical system which permits vertical illumination of the workpiece 15 serves for the microscopic observation of the electron beam 11 impinging upon the workpiece 15. The said system consists of an illuminating system 20 which supplies parallel light. The said light is reflected via two metallic prisms 21 and 22 upon a lens 23 capable of being displaced in the axial direction and is focussed by the said lens upon the object or workpiece 15. Below the lens 23 there is arranged an interchangeable glass plate 24 wihch protects the lens from any vaporization products. The lens 23 together with the glass plate 24 is moved in the axial direction by means of the knob 25. The light reflected by and/or issuing from the surface of the workpiece 15 is rendered parallel by the lens 23 and is directed by the mirror 26 into the observation system 27 constructed as a stereo-microscope. Inside the operating chamber 28 the workpiece 15 is located by means of the holding device 16 upon a schematically represented mechanical stage 17 which can be moved in the direction of the arrow by means of the electric motor 18.

Between the deflecting system 14 and the workpiece 15 an annular interceptor electrode 30 is arranged so as to be capable of being swivelled out of the way and is supported by an insulator 29. In the operating chamber 28 there is furthermore a mechanical feeler rod 31 which rotates a pinion 32 by means of a rack. The pinion 32 is preferably connected to a potentiometer and the current flowing through the said potentiometer goes into a storage apparatus 33. The storage apparatus 33 is connected to the electric motor 18 so that the delay between storage and readout is adjusted according to the speed of rotation of the motor 18. When the delay time set has elapsed a signal is delivered by the store 33 to the generator 34. By means of the said signal the current flowing through the focussing lines 13 is adjusted.

The mode of action of the device for the automatic focusing is as follows. When the workpiece 15 is moved in the direction of the welding action the mean value of the current flowing through the focussing lens 13 is first adjusted by means of the sensing point 31 in the manner described above. Therein the time interval during which the signal is stored in the store 33 is adjusted in such a way that the signal determining the mean value of the lens current is delivered to the generator 34 when the workpiece 15 has moved so far that the point on the surface measured by the sensing point 31 has reached the area of incidence of the electron beam 11. The store 33 may for instance be constructed as a magnetic tape with two tapeheads wherein one head serves to record the signal delivered by the potentiometer 32 and the other head serves to pass the said signal on to the generator 34. The speed of the magnetic tape is therein varied by the electric motor 18.

Figure 11:
FIG. 11 is an elevation view showing a workpiece and the outlines of impinging charge carrier beams in different condition of focussing.

By means of the feeler 31 the current flowing through the focussing lens 13 is therefore adjusted in such a way that coarse focussing of the electron beam 11 upon the workpiece 15 is attained. Simultaneously, the lens current generator 34 is actuated by electric motor 35 that a current flows through the focussing lens 13 which oscillates periodically about the preset value. The amplitude of the variation of the lens current is chosen in such a way that during a period of amplitude variation the optimum focussing condition of the beam 11 is passed with certainty. The electron beam 11 passes during the periodic variation of the current flowing through the focussing lens 13 through a variety of focussing conditions of which some examples are represented in FIG. 11. As can be seen from the said figure the beam 11a is focussed below the surface of the workpiece while the beam 11b is focussed upon the workpiece surface and the beam 11c is focussed above the workpiece surface.

Figure 2:
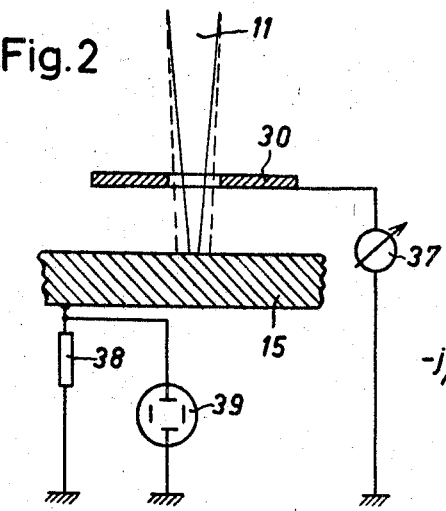
FIG. 2 is an enlarged partially sectioned view of a portion of the apparatus shown in FIG. 1, and illustrating schematically the coupling of the workpiece to an oscilloscope.

In the defocussed condition of the electron beam 11 as it is e.g., represented in dashed lines in FIG. 2 the interceptor 30 will be reached only by electrons reflected by the workpiece surface 15. The said interceptor is in FIG. 2 connected to ground via a current measuring device 37 while in the representation of FIG. 1 the interceptor is connected to a switching device 26. In the representation of FIG. 2, for the purpose of better representation, the workpiece 15 is connected to earth via a resistance 38 and the voltage drop in the resistance 38 is fed to oscillograph 39.

Figure 3A:
FIGS. 3a and 3b are respectively plots of waveforms displayed on the oscilloscope of FIG. 2 with the beam improperly and properly focussed.
Figure 3B:
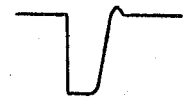

If the electron beam 11 is made effective in the shape of impulses then the voltage course represented in FIG. 3a is registered upon the fluorescent screen of the oscillograph 39 as long as the electron beam 11 is defocussed. If now the state of focussing of the electron beam 11 is improved then thermal electrons are finally emitted from the workpiece 15 and simultaneously positive ions occur. Therein one may observe upon the fluorescent screen of the oscillograph 39 that the impulse becomes narrower as is represented in FIG. 3b. If for example the workpiece consists of tungsten then, as can be seen in FIG. 3b, there occurs a short rise towards the positive side at the end of the narrowed impulse.

Figure 4:
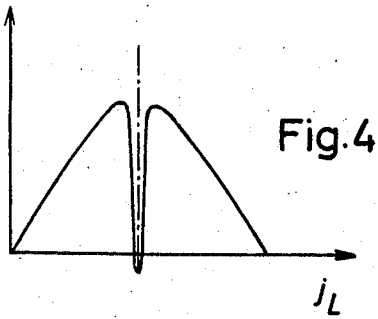
FIG. 4 is a plot of the interceptor current $j_A$ as a function of the current $j_L$ flowing through the focussing lens during working of tungsten.

The course of the interceptor current $j_A$ as a function of the current $j_L$ flowing through the focussing lens 13 is represented in FIG. 4. As can be seen, a continuously increasing electron current flows to the interceptor in the defocussed condition of the electron beam 11. In the focussed condition of the electron beam 11 the interceptor current $j_A$ reaches a minimum and, in the case of the working of tungsten, it even rises to the positive side. As can be recognized in FIG. 4 the minimum of the interceptor current is very sharply defined. As soon as the said minimum is reached the electric motor 35 is switched off by means of the switching device 36 in FIG. 1. Thereby the current flowing through the focussing lens 13 at that moment is maintained so that therefore the electron beam 11 remains focussed upon the surface of the workpiece 15 as is shown in full lines in FIG. 2.

The generator 34 may for instance be designed in such a way that it contains a potentiometer making the lens current constant. The said potentiometer winding is rotated with respect to the sliding contact according to the signals furnished by the storage device 33. The sliding arm of the potentiometer is oscillated periodically about a central position by means of the electric motor 35. It is easily understood that the rotation of the potentiometer as a whole will set the mean value of the current flowing through the focussing lens 13 while a periodic variation of the said current is produced by means of the electric motor 35 operating on the sliding contact of the potentiometer.

It is advantageous to carry out automatic focussing only at periodic intervals and to swivel the interceptor 30 out of the immediate vicinity of the beam 11 in the intervening periods in order to avoid soiling of the interceptor by vaporized particles of the material. An automatically acting device may be provided for the said purpose which swivels the interceptor 30 into the position drawn in FIG. 1 either after predetermined intervals or else in dependence upon the amount of the signal delivered by the sensing point 31.

Figure 5A:
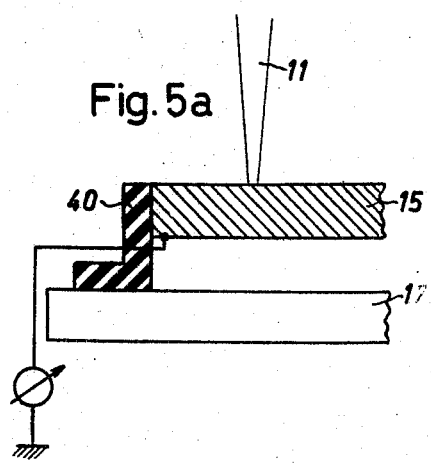
FIG. 5a is a partially sectioned view of a workpiece insulated from ground and illustrating schematically the circuit for measuring current to ground.
Figure 5B:
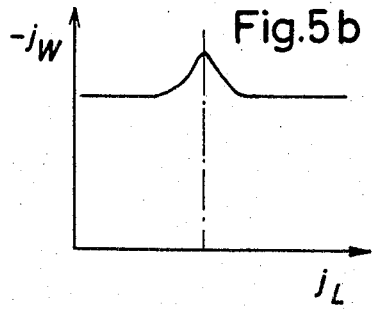
FIG. 5b is a plot of the current $j_W$ to ground for the circuit of FIG. 5a as a function of current $j_L$ through the focussing lens.
Figure 6:
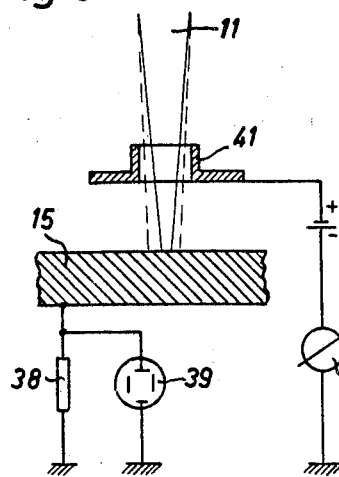
FIG. 6 is a partially sectioned view to enlarged scale of the workpiece and interceptor and schematically illustrating the circuit for positive bias of the interceptor and measurement of the current from workpiece to ground.

In FIG. 5a the workpiece 15 is supported upon the mechanical stage 17 by means of an insulator 40. For the purpose of automatic focussing there is here used a current measuring instrument 41 which measures the current $j_w$ flowing from the object to earth. The said current will reach a maximum as shown in FIG. 5b when the electron beam 11 is focussed. In this case therefore the switching device 36 of FIG. 1 is constructed in such a way that it renders the electric motor 35 inoperative as soon as the current flowing from the object to earth has reached its maximum. FIG. 6 shows an enlarged partial section of the workpiece 15 to which is correlated an interceptor 41 having positive bias relative to the workpiece. The workpiece 15 consists in this case of a metal or low electron emission and of low melting point such as steel.

Figure 7A:
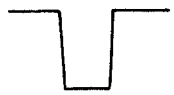
FIGS. 7a and 7b are respectively plots of the oscilloscope traces of the current to ground in the circuit of FIG. 6 for an unfocussed and focussed beam.
Figure 7B:
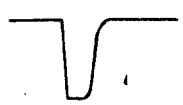

FIG. 7a shows again the electron beam impulses registered upon the fluorescent screen of the oscillograph 39 when the electron beam 11 is defocussed. In the focussed condition of the beam 11 the registered impulse becomes narrower as is shown in FIG. 7b. The registered impulse does not, however have a positive going portion.

Figure 8:
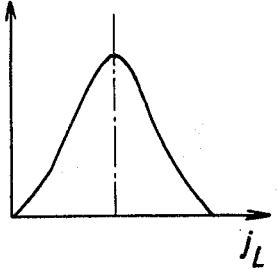
FIG. 8 is a plot of the interceptor current $j_A$ as a function of current $j_L$ through the focussing lens during treatment of a workpiece of low electron emission and low melting point, such as steel, during working by a pulsed charge carrier beam.

FIG. 8 shows the interceptor current $j_A$ as a function of the current $j_L$ flowing through the focusing lens 13. As can be seen in the said figure the interceptor current $j_A$ will reach a maximum when the electron beam 11 has attained the optimum focussing condition. The switching device 36 represented in FIG. 1 is in the said case constructed in such a way that it switches off the electric motor 35 when the interceptor current reaches its maximum The switching device 36 is with advantage constructed in such a way that it comprises a store which continuously compares each value of the interceptor current with the subsequent value of the said current. When optimum focussing has been attained, i.e., when the interceptor current tends to pass its extreme value then the switching-off impulse for the electric motor 35 is delivered. A switching device of the said kind can always be used independently of whether it is required to produce the switching-off impulse upon attainment of a maximum or of a minimum in the interceptor current.

In the embodiment represented in FIG. 6 the bias of the interceptor 41 relative to the workpiece 15 amounts to about 6 to 20 volts. If the workpiece 15 is biassed to earth with about the same negative voltage and if the current flowing from it to earth via the resistance 38 is used for the adjustment of the focussing then the electric motor 35 must be switched off when the said current attains a minimum.

Figure 9:
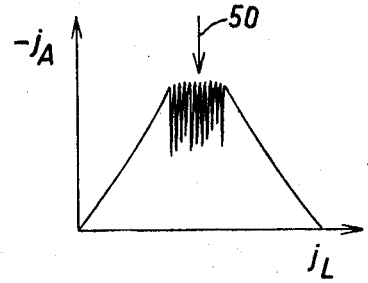
FIG. 9 is a plot of the interceptor current $j_A$ as a function of current $j_L$ through the lens during treatment of a workpiece of low electron emission and low melting point, such as steel, during working by a charge carrier beam of steady intensity.

FIG. 9 shows the interceptor current as a function of $j_A$ from the current $j_L$ flowing through the focussing lens 13 for the case that the workpiece 15 represented in the FIG. 6 is affected by a continuously impining charge carrier beam. As will be recognised no unambiguously evaluable maximum is formed in the said case but a flat course of the current is formed between the rise and the fall of the current and this is furthermore interrupted by irregular current variations. In such a case, the switching device 36 of FIG. 1 is constructed in such a way that it determines automatically the point of symmetry 50 between the flanks representing the rise and the fall of the current respectively and that upon attainment of the said point it makes constant the current flowing at the moment through the focussing lens. The point of symmetry 50 need not absolutely lie in the exact center between the flanks of the current rise and the current fall but may be automatically displaced to one side by the switching device 36 if a preliminary experiment has shown that a different position of the point of symmetry corresponds to the state of accurate focussing.

Figure 10:
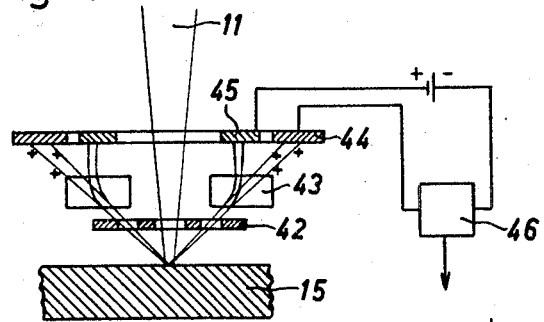
FIG. 10 is a partially sectioned view, enlarged scale, of a focus detector using electron and ion interceptors.

In FIG. 10 a diaphragm 42 is arranged above the workpiece 15 and shows two symmetrically arranged slots. The charge-carriers passing through the said slots also pass through the field of the deflecting magnet 43. By the said deflector field the electrons issuing from the workpiece 15 are deflected and reach the interceptor 45. The said interceptor has positive bias relative to the workpiece wherein the bias lies again within the range of 6 to 20 volts. The ions issuing from the workpiece 15 are scarcely influenced by the magnetic deflector field 43 because of their great mass and reach the interceptor 44.

If the workpiece 15 consists of a material of high melting point and of high electron emission then both the ion current issuing from the workpiece and the electron current issuing from it are at a maximum when the electron beam 11 is in the state of optimum focussing. Consequently, the device 46 which serves to determine the difference between the interceptor currents from the two interceptors 44 and 45 will show a minimum as soon as the electron beam 11 attains the opimum focussing state. The signal produced at the said moment by the device 46 is fed to the electric motor 35 so that the motor is switched off.

By the equipment represented in FIG. 10 particularly high accuracy is attained. If it is desired that the narrowest cross section of the electron beam 11 does not lie upon the surface of the workpiece 15 but below it or above it by a certain amount then the switching device 36 is constructed in such a way that it passes the signal serving to switch off the electric motor 35 only after a delay time which can be adjusted by hand. In the said case it can be attained that the beam 11 is adjusted as shown in FIG. 11a for instance where the electron beam is focussed below the workpiece surface. Alternatively, it is possible to attain the state of focussing designated by 11c in FIG. 11 wherein the beam 11 is focussed in such a way that the narrowest cross section of the beam lies above the workpiece surface. By suitable adjustment of the delay time in the switching device 36 the position of the locus of the narrowest beam cross section relative to the workpiece surface can be varied.

This invention may be variously embodied and modified within the scope of the subjoined claims.

What we claim is:

1. The method of focussing a charge carrier beam in equipment which generates a charge carrier beam for working material and which includes a current actuated focussing lens which consists of the steps of periodically varying the current flowing through the focussing lens, measuring the amplitude of the charge carrier emission from the material being worked, and setting the current flowing through the focussing lens at that value corresponding to measurement of an extreme value in the charge carrier emission amplitude.

2. The method in accordance with claim 1 in which the material has a high electron emission and high melting point and which includes the step of intercepting the charge carriers emitted from the material, measuring the interceptor current defined by the intercepted charge carriers, and setting the focussing lens current at the value corresponding to a minimum in the interceptor current.

3. The method in accordance with claim 1 in which the material worked is of low electron emission and low melting point and which includes the step of accelerating the charge carriers emitted from the material, intercepting the charge carriers, measuring the current defined by the intercepted charge carriers, and setting the focussing current to correspond to a maximum in the intercepted current.

4. The method in accordance with claim 1 in which the material is of high electron emission and of high melting point, in which the amplitude of the charge carrier emission from the material is measured by measuring the current flowing from the material to ground, and in which the extreme value to which the focusing current is set corresponds to a maximum in said measured current.

5. The method in accordance with claim 1 in which the material is of low electron emission and of low melting point, which includes the step of biasing the material negatively with respect to ground, and in which the amplitude of the charge carrier emission from the material is measured by measuring the current flowing from the material to ground, and in which the extreme value to which the focusing current is set corresponds to a minimum in said measured current.

6. The method in accordance with claim 1 in which the measured extreme value is a broad maximum and which includes the step of setting the focussing current at the value corresponding to the measured charge carrier emission current at the position of symmetry between the edges of the broad maximum.

7. The method in accordance with claim 1 which includes the step of measuring the distance to the surface of the material by mechanical means and roughly focussing the beam in response to such measurement and then varying the lens current about the amplitude of rough focus.

8. The method in accordance with claim 1 in which the frequency of the lens current variation is low.

9. The method in accordance with claim 1 in which the extreme value of charge carrier emission from the material is determined by storing instantaneous values and comparing said stored value with the subsequent measured value and in which the lens current is set upon cessation of change in said comparison.

10. The method in accordance with claim 1 which includes the step of delaying the setting of the lens current to focus the beam with the plane of the smallest cross section of the beam being displaced from the plane of the material surface along the beam axis.

11. Apparatus for focusing the beam of a charge carrier generator having a current responsive magnetic lens to focus the beam impinging on the surface of material to be worked comprising means to periodically vary the current through said lens, means to measure the amplitude of the current established by the charge carrier emission from the material surface during variation of the lens current, and means to set the lens current at the amplitude corresponding to an amplitude extreme in the measured emission 12. Apparatus in accordance with claim 11 which includes an interceptor electrode positioned above the material surface to collect the charge carriers emitted therefrom and to determine the emission current amplitude.

13. Apparatus in accordance with claim 11 in which said means for the periodic variation of the amplitude of the current flowing through the focusing lens consists of a potentiometer actuated by an electric motor.

14. Apparatus in accordance with claim 11 which includes a first and second interceptor electrodes positioned between the focussing lens and the material, said interceptor electrodes adapted respectively to intercept the electrons and ions issuing from the materials said first interceptor electrode being positively biased relative to the material and a deflector magnet positioned adjacent said first interceptor electrode.

15. Apparatus according to claim 14 in which both interceptors are connected to a switching device serving to determine the difference between the respective interceptor currents and to stop the lens current variation upon attainment of a minimum in the said difference.

16. In an electron beam machine for performing metal machining operations such as welding, melting, etching and the like, wherein a self-accelerated gun emits a beam of electrons to impinge on a small area of the workpiece with a high watt density whereby low energy electrons are thermionically emitted, the improvement comprising: a pickup electrode located in line-of-sight relation to the area of the workpiece subject to impingement by the beam, means for biasing the electrode positive to the workpiece so that the electrode attracts said thermionically emitted electrons and electric circuit means including indicator means connected to said electrode for generating an output signal varying as a function of degree of focus of said beam of electrons.

17. The improved machine of claim 16 wherein the electrode comprises a plate mounted above the workpiece, said plate having an aperture therein to permit passage of said electron beam.

18. In an electron beam machine for performing metal machining operations such as welding, melting, etching and the like, wherein a self-accelerated gun emits a beam of electrons to impinge on a small area of the workpiece with a high watt density whereby low energy electrons are thermionically emitted, the improvement comprising: a pickup electrode located in line-of-sight relation to the area of the workpiece subject to impingement by the beam, means for biasing the electrode positive to the workpiece so that the electrode attracts said thermionically emitted electrons and electric circuit means for transmitting an output signal from said electrode varying as a function of the electron curent flowing through said electrode, and wherein an electromagnetic focus coil is provided for adjusting the focus of the electron beam downstream of the gun and the improvement further comprises means responsive to the current through said electrode for automatically adjusting the focus of said beam of electrons.

19. The improved machine of claim 18 wherein the electrode comprises a plate mounted between the workpiece and gun, said plate having an aperture therein to permit passage of said electron beam.

References Cited by the Examiner

UNITED STATES PATENTS

| 2,640,948 | 6/1953 | Burrill | 250—49.5 X |
| 2,771,568 | 11/1956 | Steigerwald | 250—49.5 X |
| 3,033,974 | 5/1962 | Schleich et al. | 219—117 |
| 3,054,896 | 9/1962 | Jones et al. | 250—41.9 |
| 3,158,733 | 11/1964 | Sibley | 219—117 |

JOSEPH V. TRUHE, *Primary Examiner.*

R. G. NIELSEN, R. M. WOOD, *Examiners.*

H. S. MILLER, G. E. MATTHEWS,
*Assistant Examiners.*